United States Patent [19]

Bell

[11] 4,020,734
[45] May 3, 1977

[54] TENSION INDICATOR FOR FASTENER MEANS

[75] Inventor: Walter Bell, Monroe, N.Y.

[73] Assignee: Star Expansion Industries Corporation, Mountainville, N.Y.

[22] Filed: Nov. 26, 1975

[21] Appl. No.: 635,613

[52] U.S. Cl. .................................... 85/62; 151/35
[51] Int. Cl.² .................................... F16B 31/02
[58] Field of Search ............ 85/50 R, 50 A, 50 B, 85/50 C, 61, 62; 151/35, 38; 73/88 F

[56] References Cited

UNITED STATES PATENTS

| 253,886 | 2/1882 | Over | 85/50 R |
|---|---|---|---|
| 1,028,290 | 6/1912 | Sessions | 85/50 R X |
| 2,464,152 | 3/1949 | Ralston | 85/62 |
| 2,747,166 | 5/1956 | Hoffarth | 85/50 R X |
| 2,781,687 | 2/1957 | Knocke | 85/62 |
| 2,817,380 | 12/1957 | Knohl | 151/37 |
| 2,936,805 | 5/1960 | Rice | 151/38 |
| 3,036,283 | 5/1962 | Singdale et al. | 73/88 F UX |
| 3,133,468 | 5/1964 | Cumming | 85/62 |
| 3,187,621 | 6/1965 | Turner | 85/62 |
| 3,329,875 | 7/1967 | Demeritt | 151/38 |
| 3,352,344 | 11/1967 | Lanius | 151/35 |
| 3,458,132 | 7/1969 | Newton | 151/38 X |
| 3,691,897 | 9/1972 | Mullaney | 85/62 |
| 3,834,269 | 9/1974 | Ohringer | 85/62 |

FOREIGN PATENTS OR APPLICATIONS

| 730,428 | 5/1932 | France | 151/38 |
|---|---|---|---|
| 628,881 | 7/1927 | France | 151/38 |
| 661,412 | 11/1936 | Germany | 151/35 |

*Primary Examiner*—Roy D. Frazier
*Assistant Examiner*—Thomas J. Holko
*Attorney, Agent, or Firm*—Friedman, Goodman & Teitelbaum

[57] ABSTRACT

A tension indicator for use with fasteners such as a cooperating nut and bolt. The tension indicator comprises a pair of washers for placing on the shank of the bolt between the bolthead or nut and the workpiece that is to be secured by the fastener. Each washer includes a concave central portion having a hole therethrough for receiving the shank of the bolt with the concave surfaces of the washers facing in opposite directions in the assembled condition. Each washer further includes at least one finger extending outwardly from the central portion. Prior to the application of the load on the tension indicator by either the fastener or the workpiece, the outermost end faces of the coacting fingers will be at equal and opposite angles with respect to each other. After a predetermined load has been applied to the fastener, the outermost end faces of the coacting fingers will be aligned with each other to thereby visually indicate that the desired load has been achieved. Preferably, each washer has a plurality of fingers, each washer including first and second spaced apart and diametrically opposed pairs of fingers as well as one pair of diametrically opposed single fingers that are interdigitated with the two pairs of spaced apart fingers in the assembled condition. In one embodiment, the desired load is achieved when the washers are fully compressed, while in a second embodiment the desired load is achieved before full compression of the washers is achieved. If desired, teeth may be formed on the central portion of each washer about the hole therethrough so that the washer acts as a lock washer.

8 Claims, 14 Drawing Figures

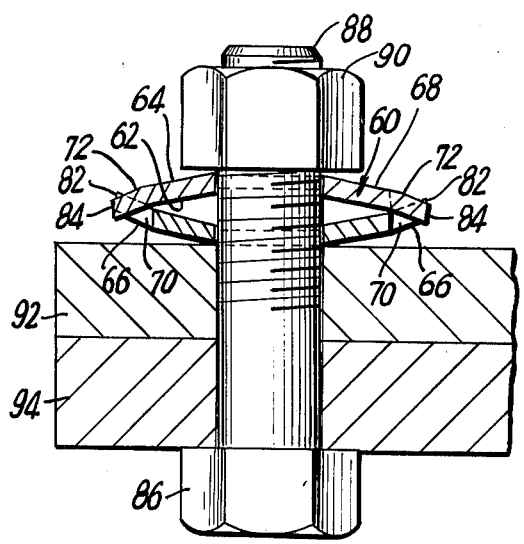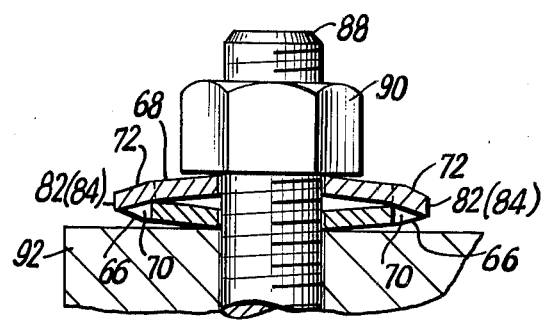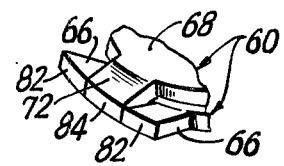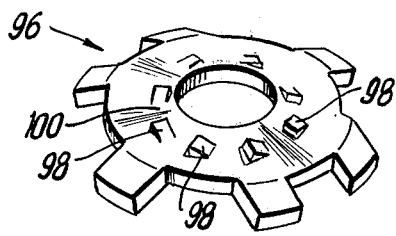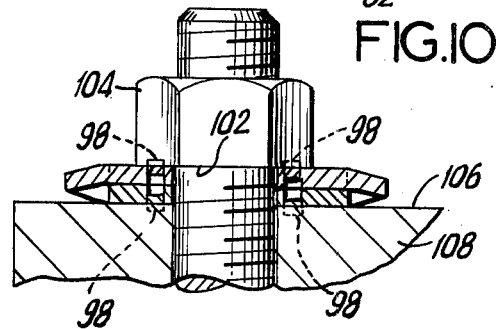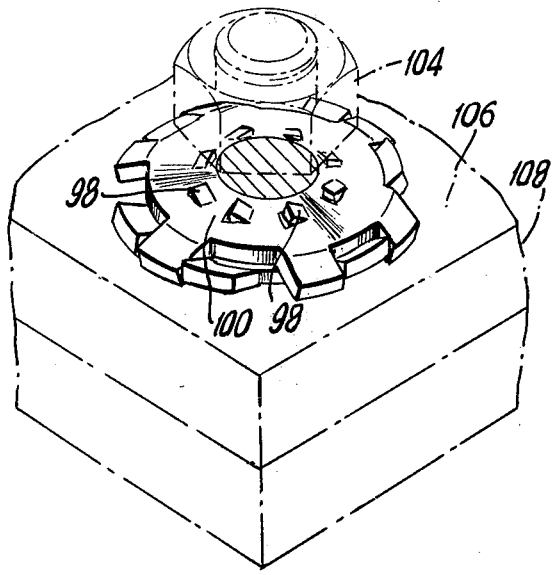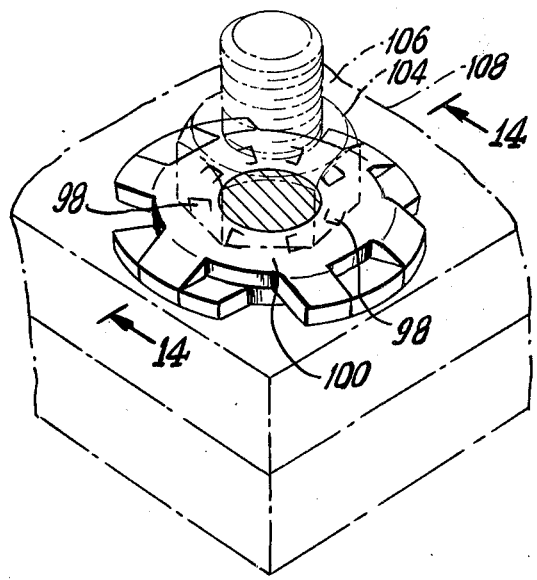

TENSION INDICATOR FOR FASTENER MEANS

BACKGROUND OF THE INVENTION

1. Field of the Invention

This invention relates to tension indicators for fastener means such as nuts and bolts and more particularly to a washer type tension indicator that provides visual indication of the achievement of a predetermined load.

2. Description of the Prior Art

When a nut and a bolt are used to hold or clamp two parts together it is frequently desirable to know the tension produced in the bolt or the compressive forces of the nut when the nut is tightened. It is also frequently necessary to become aware when the tension in such joint reaches the predetermined value. In addition, it is also important to know that the joint has not relaxed tension over a period of time even though the initial joint may have attained the predetermined tension.

The foregoing is especially true of nuts and bolts which are subject to loads of considerable magnitude or when the load varies during the operating cycle of a machine or where there is a gasket between the parts clamped together by the nut and the bolt.

Considering the case of a bolt and nut which are subjected to a variable load of considerably magnitude, if the nut is too loose and sufficient original tension has not been developed in the bolt, the nut may unscrew and the parts clamped together may separate when the load increases during the operating cycle of the machine. Consequently, if the nut is too tight and too high a tension has been developed in the bolt, the bolt may fail due to fatigue caused by the high variable stress produced when the variable external load is combined with initial high tension.

An approach to the solution of proper bolt tension has been the development of so called wrenches which measure the torque required to tighten the nut. The actual tension produced in a bolt however is only roughly proportional to the torque required to tighten the nut. This is due to variations of the extreme pressure, qualities of the lubricant used, the roughness of the threads, and the quantity of dirt on the threads. It has been found that the torque required to tighten the same nut and bolt, under the same load, will vary at least 25% and considerably more if the threads are scuffed or the lubricant changed. Obviously, the use of a torque wrench is not a sufficiently accurate method of indicating bolt tension for modern machinery.

Other prior art methods of indicating tension in a joint utilize a portion or portions of a member that are deformable at a certain tension. However, such a system will not continue to monitor the joints to thereby provide an indication of when the tension relaxes.

Still another approach to the problem is disclosed in U.S. Pat. No. 2,464,152 granted on Mar. 8, 1949 to E. K. Ralston. In the Ralson patent there is disclosed a dished compression spring washer member and a force applying member having a bearing surface that faces and is normally spaced from the outwardly dished surface of the washer member so as to bear against the aperture therein. A separate indicator means is mounted on either the spring washer member or the force applying member and engages both of the members upon a predetermined deflection of the washer member to thereby indicate when the washer member has been deflected by the predetermined amount. In operation of the Ralson structure a specially shaped nut is tightened on the bolt with an ordinary wrench or tool and, upon being tightened, the nut functions as a force imparting member to apply the load to the conical spring washer which is attached to the nut. The nut is then tightened until the space between the outer edges of the washer and the bearing face of the nut increases to a certain, prescribed distance and this prescribed distance may then be measured by a feeler gauge.

It will be appreciated that with the Ralston patent a separate feeler gauge must be used requiring considerable skill. Further, should the feeler gauge be lost, it will be impossible to use the Ralston structure. Still further, should there be a requirement for determining the exact tension of a fastener in an environment that is very dirty, then the building of oil and grit will minimize the effectiveness of the feeler gauge. This is particularly true when it is considered that the space occupied by the feeler gauge may be measured in thousandths of an inch.

Still another example of the prior art in the general field to which the present invention is directed is disclosed in another U.S. Pat. No. 2,850,937, granted on Sept. 9, 1958 to E. K. Ralston. This second Ralston patent discloses a concave Belleville disk-type washer that is positioned between the bolt head portion and the seat with the washer having at least one substantially planar edge. The washer is slightly dished and is adapted to warp and distort when subjected to axial compression. The apex end of the washer in the unstressed condition extends away from the seat with the planar side being concave. The seat provides a bearing surface for the washer and a ridge intermediate the radially inner and outer edges of the washer, with the bolt head exerting pressure on the inner edge of the washer to pull it towards the seat in the stress condition so that the outermost perimeter of the washer is disposed a distance away from the seat to indicate the tension on the bolt. In the second Ralston patent the washer snaps from an outwardly directed concave configuration to an outwardly directed convex configuration when the proper tension has been achieved. However, since the second Ralston patent teaches a snap action arrangement there can be no indication of the approach to the desired tension.

Still another form of prior art relates to the present invention is disclosed in U.S. Pat. No. 3,474,701 issued to P. C. Seltzer on Oct. 28, 1969. In this last mentioned patent there is disclosed another snap acting type of indicating means. A body of deflectable, metallic material having a leading end to transfer clamping force and an opposite back end is formed as part of the head of a bolt, a nut or a washer. The leading end is provided with an annular bearing land that is arranged to contact the opposed one of the parts for applying the clamping force. The annular bearing land is arranged about an annular set-back zone having a transverse face. An inner annular section is deflected toward the opposed part upon application of an ideal degree of preload but short of contacting the opposed part. The body back carries an annular fulcrum and an axial extension projecting from the fulcrum. An annular support is fixedly mounted on the extension in axially adjusted position that is dictated by the critical amount of preload to be applied. The leading side carries another annular fulcrum of different diameter and spaced axially from and opposed to the first fulcrum to define an intervening space. A cupped bi-stable Belleville washer is loosely mounted about the extension within the space intervening the opposed fulcrum.

As the Seltzer body is progressively deflected axially by application of a preload to the critical amount thereof, the fulcrums are caused to approach each other to to a degree that stresses the Belleville washer sufficiently to cause it to snap over-center so as to indicate imposition of the critical amount of preloading. The fulcrum of lesser diameter is flanked by an annular surface against which the Belleville washer will slap as it snaps over so as to provide an enhanced, audible indication supplementing the amplified visual and tactile indications provided by gross washer deflection of attainment of the critical degree of preloading. It will be appreciated that in the Seltzer patent, even though an audible, visual and tactile indication is provided at the attainment of the critical degree of preloading, there is still no means provided for indicating the approach to the critical degree of preloading.

SUMMARY OF THE INVENTION

The present invention provides a tension indicator that is used with fastener means such as a cooperating nut and bolt that are adapted to be applied to a workpiece. The present invention is also applicable to a bolt that is merely threaded into a workpiece for the purpose of holding another part thereon. In the present invention the tension indicator comprises a pair of washers that are adapted to be placed on the shank of the fastener between a load applying surface such as the undersurface of the head of the bolt and the opposed workpiece surface. Each of the washers includes a concave central portion having a hole therethrough for receiving the shank of the fastener. The concave surface of the pair of washers face in opposite directions in the assembled condition. Each of the pair of washers further includes at least one finger extending outwardly from the central portion. In the unstressed condition of the present invention, the outermost end faces of the fingers will be at equal and opposite angles with respect to each other. As the load is applied by the bolt, the outermost end faces of the fingers approach a common plane. When the outermost end of the fingers are exactly in the same plane there will be a visual as well as a tactile indication of the achievement of the desired tension.

Preferably, first and second pair of laterally spaced apart fingers are provided with the pairs of fingers being diametrically opposed to each other. In addition, there is another pair of single fingers that are also diametrically opposed to each other and which are 90° removed from the first and second pairs of fingers. In the assembled condition, the single pair of fingers are interdigitated with the two pairs of spaced apart fingers.

In one embodiment of the invention the angle of the outermost end face of each finger, with respect to a vertical plane, is substantially equal to the angle of the concave portion with respect to a horizontal plane prior to the application of the load and at least the convex portion is substantially parallel to the plane of the workpiece when the predetermined load is reached.

In another embodiment of the invention, the end faces of the fingers are substantially at a shallower angle than in the first embodiment and coincidence of the end faces in a common plane is achieved before the washers are fully compressed. Teeth may be formed on each washer to provide a lock washer.

Accordingly, it is an object of the present invention to provide improved tension indicating means for fasteners such as nuts and bolts.

It is another object of the present invention to provide an improved tension indicator, as described above, wherein a pair of oppositely directed, cup-shaped washers are provided, having outwardly extending fingers with the outermost ends of the fingers being utilized to indicate the achievement of the required tension.

Still another object of the present invention is to provide an improved tension indicator, as described above, wherein the outermost end faces of the fingers are in a common plane when the predetermined, desired load has been achieved.

A further object of the present invention is to provide an improved tension indicator, as described above, wherein there are plurality of fingers on each of the washers.

Yet another object of the present invention is to provide an improved tension indicator as described above, wherein the fingers of one of the washers are interdigitated with the fingers of the other washer.

These and other objects, features and advantages of the invention will, in part, be pointed out with particularity, and will, in part, become obvious from the following more detailed description of the invention, taken in conjunction with the accompanying drawing, which forms an integral part thereof.

BRIEF DESCRIPTION OF THE DRAWINGS

In the various figures of the drawings, like reference characters designate like parts. In the drawing:

FIG. 8 is a sectional elevational view, similar to FIG. 3 illustrating an alternative embodiment of the present invention;

FIG. 9 is a fragmentary sectional elevational view, illustrating a desired load having been applied to the pair of washers shown in FIG. 8;

FIG. 10 is a fragmentary, perspective view illustrating the fingers and their outermost end faces of the washers shown in FIG. 9 with a predetermined, desired load having been applied thereto;

FIG. 11 is a perspective view illustrating a modification of the washer comprising the present invention;

FIG. 12 is a perspective view, similar to FIG. 2, illustrating the modification of the washer shown in FIG. 10 prior to the application of a load thereto;

FIG. 13 is a perspective view, similar to FIG. 12, illustrating the components thereof after the predetermined desired load has been applied thereto; and FIG. 14 is a fragmentary sectional elevational view taken along line 14—14 of FIG. 13.

DESCRIPTION OF THE PREFERRED EMBODIMENT

Figure 1:
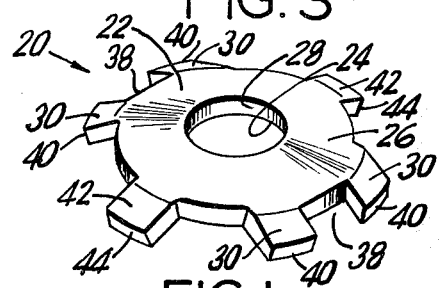
FIG. 1 is a perspective view illustrating one of a pair of identical washers comprising the tension indicator of the present invention.

Referring now to FIG. 1 there is shown one of a pair of washers 20 comprising the tension indicator of the present invention. Each washer 20 is comprised of a central portion 22 having a concave surface 24 and a convex surface 26. A hole 28 is formed through the central portion 22. There is further provided first and second diametrically opposed pairs of laterally spaced apart fingers 30 extending from the central portion 22 with the fingers 30 in each pair defining a gap 38 therebetween. For reasons which will be apparent hereinafter, the outermost end faces 40 of the fingers 30 are formed at a specific angle which will be subsequently described.

Each washer 20 further includes a second pair of single fingers 42 which extend outwardly from the central portion 22 at a position 90° away from the pair of fingers 30. The fingers 42 are also diametrically opposed to each other and each having an end face 48 that is also formed at a predetermined angle which will be discussed more fully hereinafter.

Figure 3:
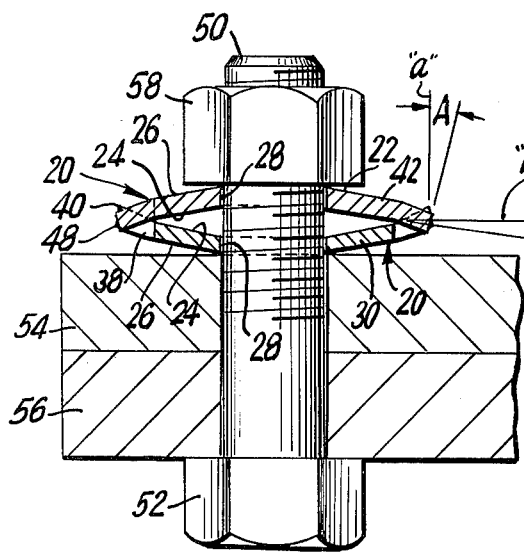
FIG. 3 is a sectional elevation view of FIG. 2.
Figure 2:
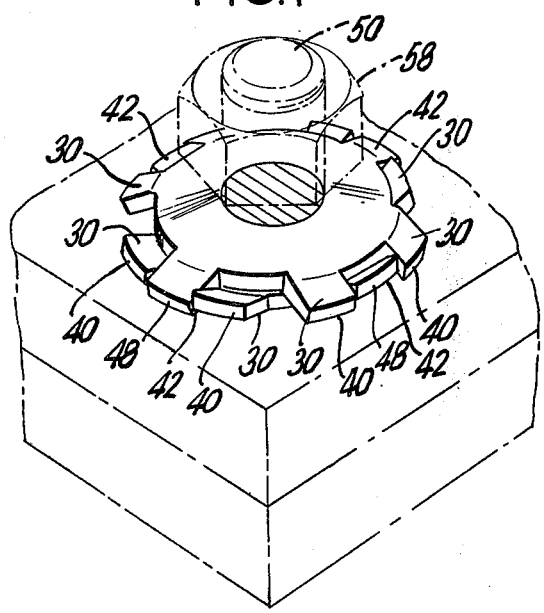
FIG. 2 is a perspective view illustrating a pair of the washer shown in FIG. 1, together with fastener means and a workpiece prior to the application of a load.

Turning now to FIGS. 2 and 3 it will be seen that, in order to practice the present invention, a pair of washers 20 are assembled on the shank 50 of a bolt 52 that passes through two workpieces 54 and 56 which are to be joined together. The two washers 20 are captured by means of a nut 58 that is threaded on the shank 50 of the bolt 52. The fingers 30 of one washer are interdigitated with the fingers of the other washer to interlock the washers together to prevent relative rotation therebetween.

As shown best in FIG. 3 the concave surfaces 24 of the washers 20 are assembled in confronting relationship with each other. In addition, the angle A of the end face 40 of the fingers 30 with respect to a vertical plane $a$ is substantially the same as the angle B of the concave surface 24 with respect to a horizontal plane $b$. It should be noted at this time that, since the concave surfaces 24 of the washers 20 are in opposition to each other, the angularly oriented end faces 40 and 48 of the fingers 30 and 42 will be at equal and opposite angles with respect to each other.

Figure 4:
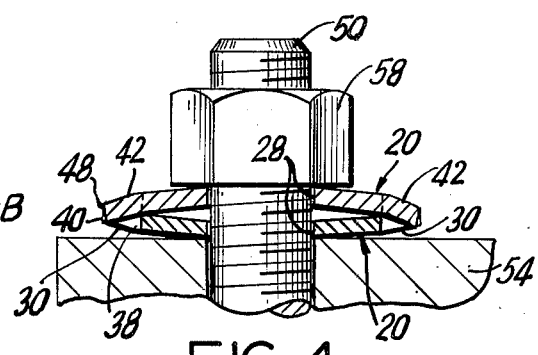
FIG. 4 is a fragmentary sectional elevational view, similar to FIG. 3, illustrating the components shown in FIG. 3 with a partial load applied thereto.
Figure 5:
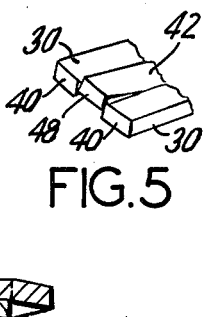
FIG. 5 is a fragmentary, perspective view illustrating the fingers and their outermost end faces of the washers shown in FIG. 4 with a partial load having been applied thereto.
Figure 7:
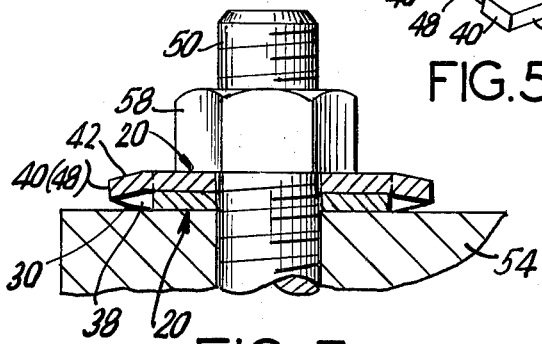
FIG. 7 is a fragmentary sectional elevational view of FIG. 6.
Figure 6:
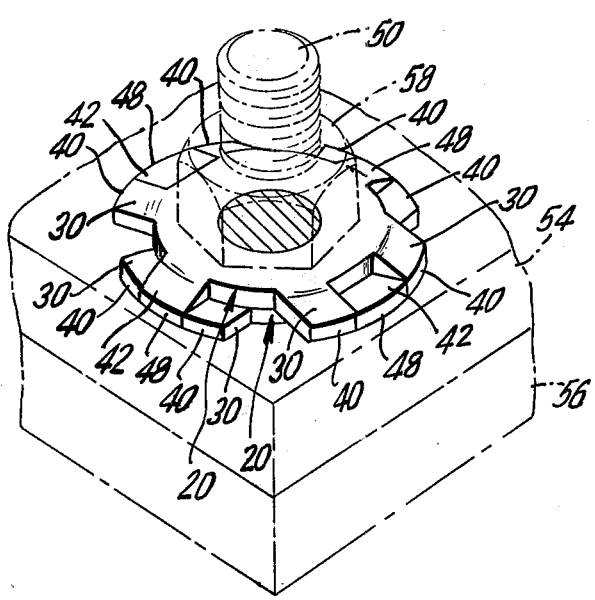
FIG. 6 is a perspective view similar to FIG. 2 illustrating the components thereof with a predetermined, desired load applied thereto.

As the nut 58 is threaded downwardly on the shank 50 of the bolt 52, the two washers 20 are partially compressed as shown in FIG. 4 and the angle of the end faces 40 and 48 of the fingers 30 and 42 approach identity (FIG. 5). When the desired, predetermined load has been applied by the nut 58, the end faces 40 and 48 of the fingers 30 and 42 will be aligned with each other such as shown in FIG. 6 and FIG. 7, with the concave surfaces 24 abutting each other. The coincidence of the end faces 40 and 48 of the fingers 30 and 42 provides both visual and tactile indication of the achievement of the desired, predetermined load.

It will be appreciated that, in the first embodiment of the present invention, the desired predetermined load is achieved when the washers 20 are fully compressed. This result is possible with making the angle of the end faces 40 and 48 of the fingers 30 and 42 at approximately the same angle with respect to a vertical plane as the angle which the concave portions make with a horizontal plane.

FIGS. 8, 9 and 10 illustrate an alternative embodiment of the present invention. In the second embodiment the desired, predetermined load is achieved before full compression of the washers 60 is attained. In the second embodiment each of the washers 60 is provided with a concave surface 62 and a convex surface 64. As in the first embodiment, two diametrically opposed pairs of laterally spaced apart fingers 66 are formed integrally with the central portion 68 of each washer 60. The fingers 66 define a gap 70 therebetween. In addition, a pair of single, diametrically opposed fingers 72 are provided on each of the washers 60 with the fingers 72 being spaced 90° apart from the fingers 66. The fingers 72 also extend from the central portion 68. Each of the fingers 66 and 72 are formed with outermost end faces 82 and 84 that are at equal and opposite angles with respect to each other. In the second embodiment, the outermost end faces 82 and 84 are at a shallower angle with respect to a vertical plane than the concave portion 62 is with a horizontal plane. Thus, the desired load and therefore alignment of the end faces 82 and 84 is attained prior to complete compression of the washers, as shown in FIGS. 9 and 10.

Turning now to FIGS. 11–14, there is illustrated a modification of either of the two previously described embodiments. The modification shown for example in FIG. 11 provides a washer 96 having a plurality of teeth 98 formed on the convex surface 100 thereof. As shown best in FIG. 14, since the washers 96 are assembled in back-to-back relationship, the teeth 98 will engage the bearing surface 102 of the nut 104 as well as the surface 106 of the workpiece 108 in order to function as a lock washer.

It will be appreciated from the foregoing that an improved tension indicator for use with fasteners such as nuts and bolts have been provided. The tension indicator comprising the present invention provides both visual and tactile indications that a predetermined, desired load has been achieved. When the outermost end faces of the fingers that are formed integrally with the washers comprising the present invention are aligned with each other, the desired predetermined load has been achieved. Furthermore, because the visual and tactile indication vary as the load is being applied, it will be a simple matter to determine when the load approaches the desired level. The present invention may be used with conventional tools and is not adversely affected by a hostile environment such as excessive noise, dirt and the like.

There has been disclosed heretofore the best embodiment of the invention presently contemplated. However, it is to be understood that various changes and modifications may be made therefor without departing from the spirit of the invention.

What is claimed is:

1. A tension indicator for use with fastener means such as cooperating nut and bolt that are adapted to be applied to a workpiece, said tension indicator comprising a pair of washers adapted to be placed on the fastener means between a load applying surface thereof and the workpiece, each of said washers including opposing concave and convex surfaces, a central portion of each of said washers having a hole therethrough from said concave surface to said convex surface for receiving the fastener means, the concave surfaces of the pair of washers facing in opposite directions toward each other in an assembled condition, each of said washers further including at least one finger extending outwardly from said central portion, said one finger of each washer including an outermost end face disposed between opposing faces integrally extending from said concave and convex surfaces and between opposing sides thereof, said one finger of each washer being disposed in a side-by-side relationship to each other in said assembled condition with one of said sides of each finger being adjacent to each other, said end faces being inclined at different angles with respect to each other in said assembled condition without any load being applied to said washers, said end faces of said fingers being aligned side-by-side with each other only when a predetermined load has been applied to said washers and the fastening means, and retention means disposed on at least one of said washers for preventing relative rotation between said washers to maintain said side-by-side relationship of said fingers.

2. A tension indicator according to claim 1, wherein said retention means includes a second finger on said one of said washers, said second finger being disposed on the other side of said one finger on the other washer.

3. A tension indicator according to claim 2, wherein said second finger has an outermost end face which is aligned side-by-side with each of the other mentioned end faces when said predetermined load has been applied.

4. A tension indicator according to claim 1, wherein each of said washers includes a plurality of said fingers.

5. A tension indicator according to claim 1, wherein said outermost end face of each of said fingers is at substantially the same angle with respect to a vertical plane as is the concave portion with respect to a horizontal plane.

6. A tension indicator according to claim 1, wherein said outermost end face of each of said fingers is at a shallower angle with respect to a vertical plane than is the concave portion with respect to a horizontal plane.

7. A tension indicator according to claim 1, wherein said convex surface of said central portion is provided with a plurality of teeth that are arranged to engage the surface of the fastener and of the workpiece that are in opposition thereto.

8. A tension indicator for use with fastener means such as cooperating nut and bolt that are adapted to be applied to a workpiece, said tension indicator comprising a pair of washers adapted to be placed on the fastener means between a load applying surface thereof and the workpiece, each of said washers including a concave, central portion having a hole therethrough for receiving the fastener means, the concave surfaces of the pair of washers facing in opposite directions toward each other in an assembled condition, each of said washers further including at least one finger extending outwardly from said central portion, said one finger of each washer being disposed adjacent to each other in said assembled condition, outermost end faces of said fingers being aligned with each other only when a predetermined load has been applied to said washers and the fastening means, each of said washers including first and second diametrically opposed pairs of spaced apart fingers and one pair of diametrically opposed single fingers that are interdigitated with said two pairs of spaced apart fingers in the assembled condition.

* * * * *